D. H. WILSON.
SYSTEM OF ELECTRIC WELDING.
APPLICATION FILED JUNE 12, 1916.
1,333,359.
Patented Mar. 9, 1920.
3 SHEETS—SHEET 1.
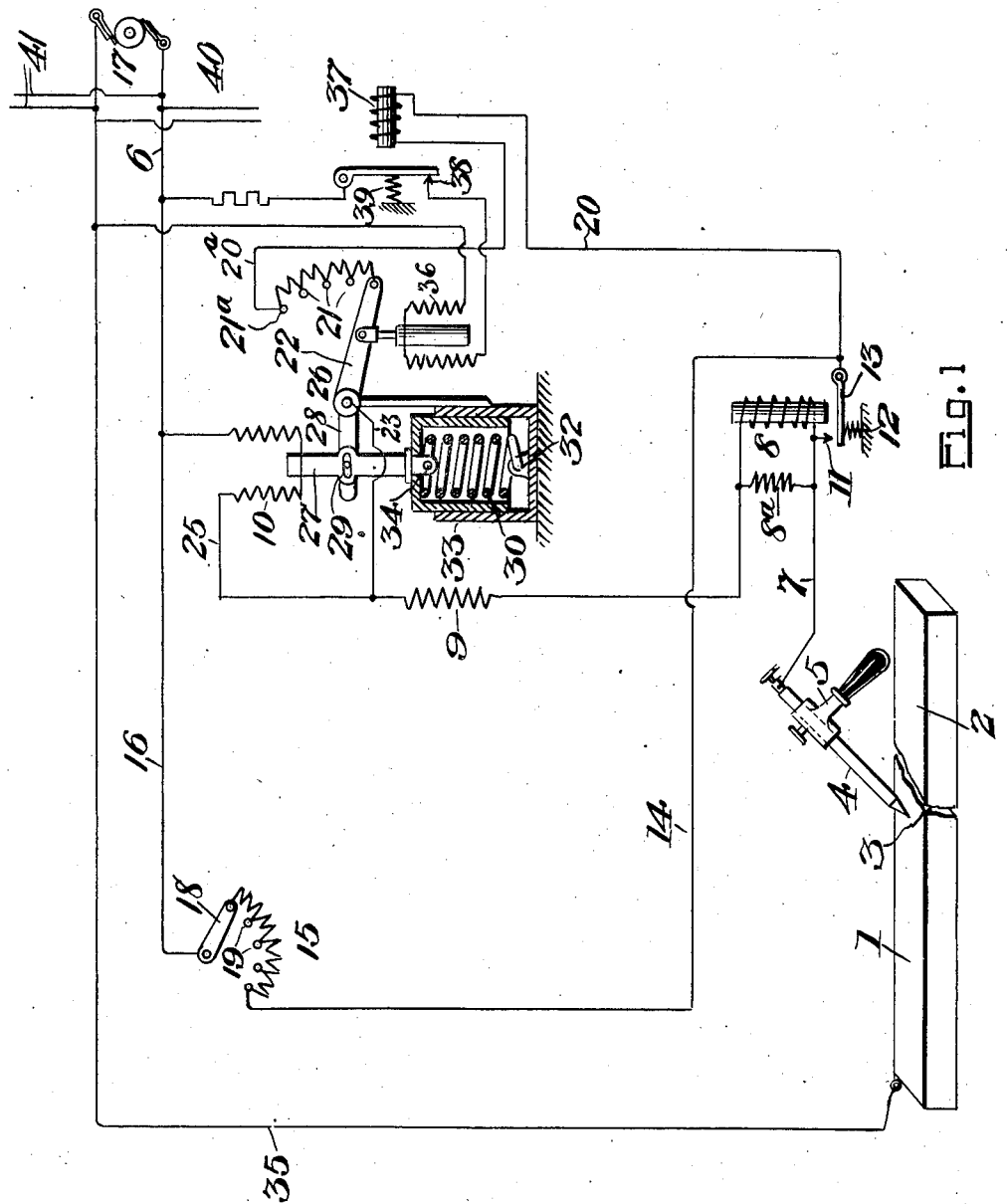
Inventor:
David H. Wilson
By Myron F. Hill
Attorney

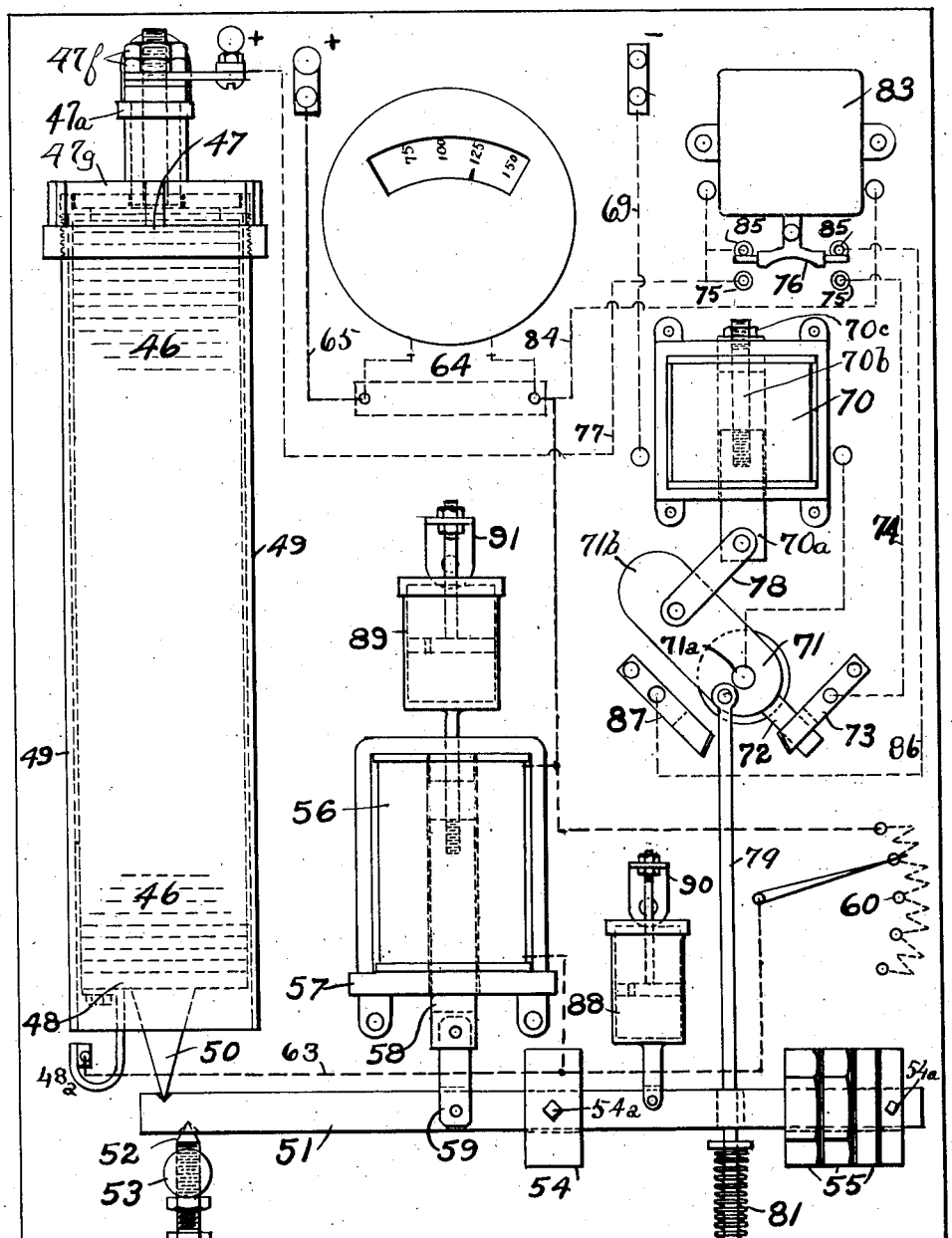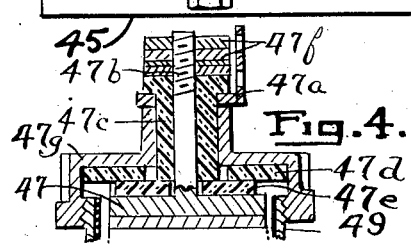

UNITED STATES PATENT OFFICE.

DAVID H. WILSON, OF FRANKLIN TOWNSHIP, BERGEN COUNTY, NEW JERSEY.

SYSTEM OF ELECTRIC WELDING.

1,333,359.  Specification of Letters Patent.  Patented Mar. 9, 1920.

Application filed June 12, 1916. Serial No. 103,157.

*To all whom it may concern:*

Be it known that I, DAVID H. WILSON, a citizen of the United States, and resident of Franklin township, in the county of Bergen and State of New Jersey, have invented certain new and useful Systems of Electric Welding, of which the following is a specification.

My invention relates to electric welding with an arc. It comprises a method of and apparatus for electric welding and it consists in such a regulation of current as will improve the character of the weld. Heretofore it has been the custom to accomplish welding by means of a current sufficiently powerful to carry a fused metal into a crack or joint between two other portions of metal. In accomplishing this result a tool is manipulated by hand in such a way that an arc is formed between the tool and the metal to be welded carrying fused metal from the tool to the metal to be welded. Such hand operated tools vary in their distance from the metal being welded with the result that the arc has to travel across a space which varies in its resistance, and consequently this varies the amperage of the current. This variation results in irregularity and porosity in the weld.

The object of my invention is to maintain a somewhat even amperage regardless of the resistance and space across which the arc has to travel in making the weld.

In other words my invention tends to off-set and counteract the irregularity of the manual manipulation of the welding tool, and thus avoid the porosity due to an irregular deposit of welding metal. This is of particular value when the electrode itself supplies the welding metal with which the welding is accomplished, the irregular current and heat causing an irregular flow of metal across the arc.

Figure 1 shows a diagram view of my invention.

Fig. 2 shows a front elevation of another form of my invention.

Fig. 4 is a section of a detail.

Figure 3:
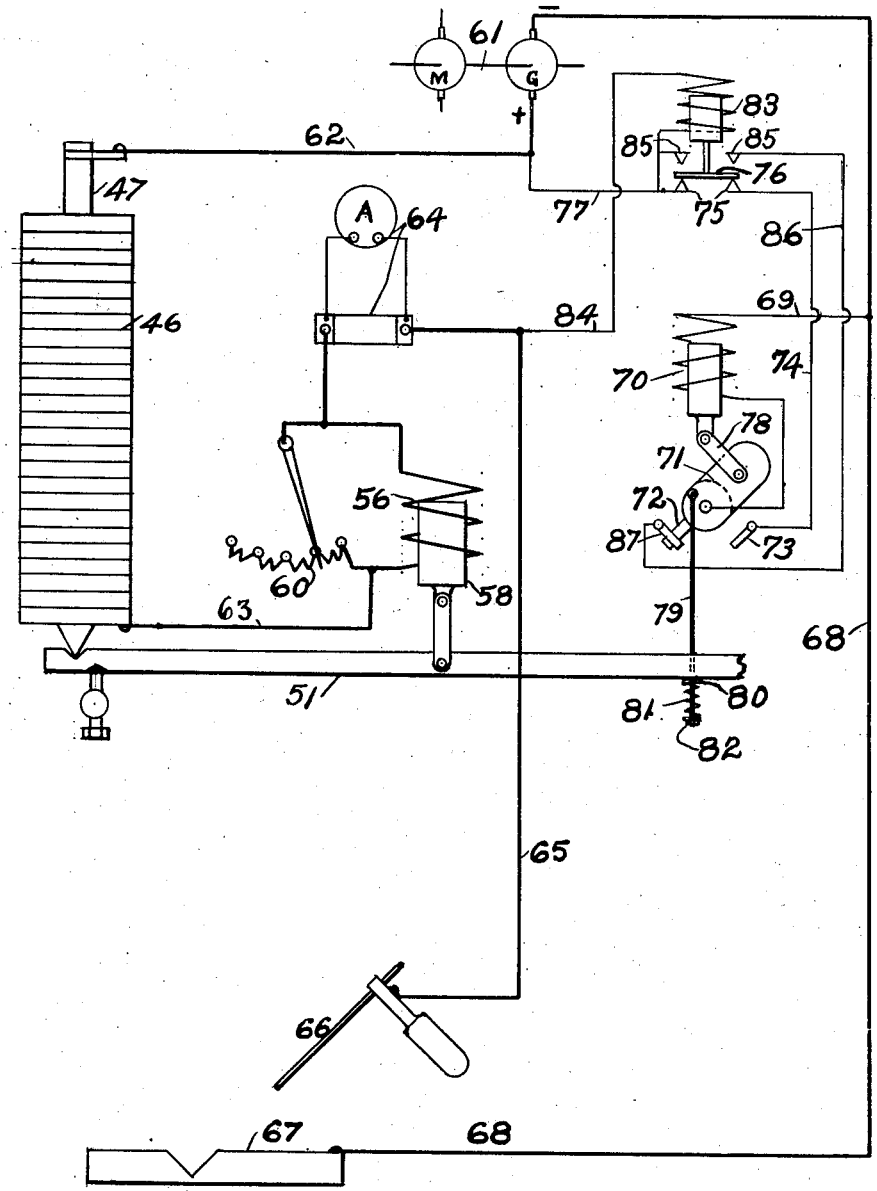
Fig. 3 shows the circuits thereof in diagram.

In Fig. 1 two portions of metal 1 and 2 are shown having a crack 3 adapted to be welded by means of the welding tool 4. The welding tool is held by an insulating handle 5 and is normally connected to a conductor 6 leading to a generator or other source of current 17 over the following circuit; conductor 7, magnetic coil 8, shunt $8^a$ in multiple therewith, resistance 9 and solenoid coil 10 to conductor 6. When the tool 4 is touched to the metal at 3 a current passes over this circuit which should have a minimum welding volume of perhaps about 25 amperes at 60 to 75 volts. The initial circuit automatically closes the open pair of contacts 11 held normally open by the spring 12 adapted to close branch circuits arranged to deliver an additional amount of current to the welding tool. The first of these branch circuits may be traced from the conductor 7 through the closed pair of contacts 11, closed by magnet 8 when energized, the armature 13, conductor 14, rheostat 15, conductor 16, thence through the line conductor 6 to the source of current indicated at 17. The rheostat 15 is designed and constructed to be operated by hand and may be set in a number of positions for the purpose of arbitrarily fixing the major amount of current intended to be delivered to the tool 4 for the particular welding operation in hand. The arm 18 of the rheostat may be swept over the contacts 19 to introduce such variable resistance as will permit the passage of say 25 or 50 or 75 or 100 or 125 amperes, as may be desired.

A second branch circuit is also established by the circuit closer 8 which may be traced as follows; conductor 7, contacts 11, armature 13, conductor 20, circuit breaker 37, conductor $20^a$, the variable resistance 21 of the automatic rheostat, arm 22 of the rheostat, conductor 23, conductor 25, solenoid 10, conductor 6 and generator 17. This branch circuit just traced may introduce a variable resistance between the tool 4 and the weld 3. This resistance at the tool varies to such an extent as would tend to vary the amperage by an amount from zero to 15 amperes or more. The variable resistance 21 should therefore have the resistances between its points so adjusted as to compensate to a considerable degree for the variation at the tool. The arm 22 of the automatic rheostat is turned upon its pivot 26 by means of the core 27 of the solenoid which is operatively connected to the arm 28 of the lever by the pin and slot 29. The core 27 is normally retracted to the position shown in the drawing by means of the coil spring 30, one end of which is secured to the projection 34 of the core 27 and the other end secured to a fixed base 32. In order to render the movements of the core 27 sluggish, a dash pot is employed one portion of which 33 is secured to the base and the other portion of which is secured to the core 27 as shown.

When current is caused to pass through the tool 4 and weld 3 the solenoid coil 10 pulls upon the core 27 raising the arm 28 of the lever causing the arm 22 of the lever to pass over the various contact points 21 of the variable resistance until the pull of the solenoid coil balances the increasing pull of the spring 30 after which the arm 22 comes substantially to rest. If the resistance between the tool 4 and the welding 3 increases, it causes a reduction of current in the solenoid 10 which permits the spring 3 to retract the core 27 thereby reducing the resistance at 21 and thus maintaining the even flow of the current through the conductor 20 to the tool 4. If the resistance at the tool is decreased a stronger pull upon the core 27 is exerted by the solenoid 10 thereby automatically introducing a greater portion of the resistance 21 into the circuit with the tool thereby also maintaining the even flow of current through the tool.

When the tool 4 is first applied to the weld it is desired to prevent a rush of current over the resistance 21. If the arm 22 under the tension of spring 30 rested on the lowest resistance point 21ª, such a rush would occur, and the fused metal would be splashed around. To prevent this a solenoid 36 is introduced in a normally closed circuit bridged across the line conductors 6 and 35 to hold the arm 22 in the position to introduce a considerable resistance into the circuit of the tool 4 until the solenoid coil 10 exerts its balancing influence upon the automatic resistance varying device 21. The current through the solenoid 10 flows also through the coil 37 and opens the contacts 38 held normally closed by spring 39 at the same instant that the solenoid exerts its balancing pull on the core 27. The arm 22 sweeps over the resistance 21 reducing the amount of resistance in the circuit until the balance is established.

The line conductors 6 and 35 may supply a current of say 60 volts and from 100 to 500 amperes, and the resistance rheostat may vary from 0 to about 2 ohms or more.

The shunt 8ª may pass the greater portion of the welding current about the circuit closer magnet 8.

It will be noted that when the welding tool 4 is brought into contact with the work, current first flows through the branch 25 thereby closing the contacts 11 and introducing the adjustable resistance 21 which builds up the current required for drawing the arc.

An additional adjustable rheostat 15 is employed adapted to be adjusted as to its resistance and adapted to complete the welding circuit when the current flows through the welding tool. The amount of resistance reduction depends upon the position of the rheostat switch arm 18 and the means for removing an adjustable portion of the resistance from the circuit consists in the conductors 16 and 14 which are brought into the welding circuit by the contacts 11.

Suitable apparatus well known to engineers may be employed in place of the diagrammatic apparatus shown.

Any kind of heating current suitable for welding may be employed, and the main purpose of my invention is to secure an even heat in the arc, regardless of the resistance of the arc or of the character of the current.

Another form of my invention is shown in Fig. 2. In this figure is shown a back board or panel 45 upon which are mounted various electrical and mechanical devices. Upon the left hand side of this panel is shown a carbon pile 46. This pile is composed of plates or disks of carbon mounted between a top fixed abutment at 47 mounted on the bracket 47ª and the bottom plate 48, each adapted to receive an electrical connection. The pile may, if desired be inclosed within a cylinder 49, the inside of which may be covered with a lining of insulating material, enamel for example, to prevent electrical contact with the edges of the disks. The upper abutment 47 has a threaded post 47ᵇ, insulated by the bushing 47ᶜ, and washers 47ᵈ and 47ᵉ from the cylinder 49. The cap 47ᵍ is screwed to the cylinder 49 (see Fig. 4). The nuts 47ᶠ secure the whole construction to the bracket 47ª. The bottom plate 48 is provided with a post 50 engaging a lever 51, which is fulcrumed upon an adjustable support or screw 52 mounted in the fixed support 53. Upon the other side of the fulcrum are mounted weighs 54 and 55. These weights are adapted to be shifted along the lever to vary the pressure upon the pile. Some of the weights 55 may be removed in order to secure the proper pressure upon the pile. Set screws 54ª may be used to hold them in position. The pressure upon the pile is adapted to be reduced by an electro-responsive device or solenoid shown at 56. Within the solenoid, which is fixed and mounted upon the bracket 57 is a core 58 suitably attached by a link 59 to the lever 51. During the operation of welding the welding current passes through the solenoid 56, and lifts the core 58 thereby lifting the right hand end of the lever 51, thereby reducing the pressure upon the carbon pile 46. A rheostat 60 may be introduced into the circuit in multiple with the solenoid 56 for the purpose of adjusting its strength and for the purpose of adjusting the amount of current traveling through the solenoid.

The operating circuit of these devices is shown more clearly in Fig. 3. A motor generator set 61 is preferably employed. It may generate a current having a potential of 60 to 75 volts, or any other suitable current that may be desired. Preferably from the positive pole of the generator is connected a conductor 62 which is connected to the carbon pile 46, the other end of which pile is connected by a conductor 63 through the solenoid 56 and rheostat 60, through the meter and its shunt 64, through the conductor 65 to the welding tool, electrode or terminal 66 adapted to be brought into contact with the work 67. The work is connected by a conductor 68 to the negative terminal of the generator 61. When the generator is in operation and the welding current traverses the circuits thus described, it passes through the carbon pile and solenoid and across the terminals 66 and 67 through an arc. The resistance of this arc is varied by different causes, by the irregularities of the operator's hand during welding, by the distance between the tool 66 and the portions of the work 67 which an arc may reach, by the cooling effect of the mass of metal at 67, by the varying temperatures surrounding the same, and perhaps by other causes. As the resistance varies in the arc, the tendency is to alter the flow of current across the arc. The moment the current starts to vary it has a corresponding effect upon the solenoid 56, so that it attracts with greater or less strength, and either reduces or increases the pressure upon the pile thereby increasing or reducing the resistance of the pile and thereby reducing or increasing the flow of current through the pile. The joint effects of these various influences is that when the resistance of the arc increases the rest of the apparatus tends to reduce the resistance of the rest of the circuit to compensate for the increasing resistance of the arc, and vice versa, thereby maintaining substantially a steady flow of current across the arc, and thereby maintaining such a flow of metal as to create an even and smooth deposit of metal from the metal terminal 66 to the work 67. When the potential of 60 to 75 volts is employed at the generator, the first contact between the terminal 66 and 67 is apt to create a rush of current and a spattering of metal that are objectionable. I employ means to prevent it. For this purpose a resistance is introduced into the circuit when the arc is started to prevent this rush of current. This resistance is introduced by the carbon pile 46. The circuits relating to this function are as follows.

From the conductor 68, the circuit is led through the conductor 69 to the electro-responsive device or solenoid 70 having a core linked to the switch 71 rotatable on its center 71ª and weighted at 71ᵇ, carrying an arm 72. This arm during welding engages the spring contact 73 establishing a circuit through the conductor 74 to contacts 75 (disconnected by the bridge 76 during welding) and by the conductors 77 and 62 to the generator. The core 70ᵇ of the solenoid 70 is connected eccentrically to the switch by the link 78. To the switch 71 is also eccentrically pivoted the supporting rod 79 carrying the abutment 80 supported loosely on the rod by the spring 81 which in turn is carried by the adjustable support 82 threaded to the rod. In Fig. 3 the abutment 80 is shown in a position ready for welding before the arc is drawn. In Fig. 2 it is shown in the position during welding.

The electro-responsive device or solenoid 83 is also shown connected in multiple with the carbon pile and solenoid 56, through the conductors 84 and 77. It is adapted to lift the bridge 76 from its normal position across contacts 75 to cross connect contacts 85 during welding, to transfer the solenoid 83 from circuit 74 and contact spring 73 into circuit with contacts 85, conductor 86 and spring contact 87.

In operation when the electrode 66 is brought into contact with the work 67 and current is established through the welding circuit, current also passes through the solenoid 83, by way of the conductors 77 and 84 with the result that the core of the solenoid 83 is lifted, and the bridge 76 leaves the contacts 75 and cross connects the contacts 85 leaving the solenoid in a circuit traced through the conductor 86 and spring 87 which, when the switch 71 has been rotated, has been brought as described into connection with the swinging arm 72. In the circuit shown in Fig. 2 the bridge is in contact with the contacts 73 and the swinging arm 72 is in contact with the spring 87. This is the welding position.

The starting or normal position is shown in Fig. 3. Before starting to weld the abutment 80 rests against the bottom of the lever 51, and the swinging arm 72 is in contact with the spring 87. The circuit of the solenoid 70 is opened, however, at the bridge 76 which is in contact only with contacts 75. At this time the resistance of the pile is sufficient when the arc is started, to prevent a rush of current. When the arc is started, and current energizes the coil 83 lifting the bridge 76 away from the contacts 75, the bridge cross connects contacts 85, throwing the current through the solenoid 70, switch 71, arm 72, spring 87, conductor 86, cross connected contacts 85, conductor 77 and conductor 62 back to the generator. This energizes the coil 70, so that its core rotates the switch 71, in a direction contrary to that of the hands of the clock, swinging the arm 72 away from the spring 87 around into contact with the spring 73 thereby establishing at this point a new circuit for the solenoid circuit which is open at the contacts 75, thereby establishing the welding position. To prevent a too violent engagement between the arm 72 and the contact springs 73 and 87, the core 70ª of the solenoid has threaded to it a rod 70ᵇ, which passes through the top of the solenoid bracket 70ᵈ and is provided with a nut 70ᶜ. This nut comes down against the top of the bracket and arrests the movement of the switch 71. When the arc is broken between the terminals 66 and 67 the coil 83 is deënergized releasing the bridge 76, so that it again cross connects contacts 75 thereby again closing the circuit of the solenoid 70, so that it is caused to operate in the reverse direction throwing its swinging arm 72 into contact with the spring 87, thus breaking the active welding circuit, and leaving the apparatus ready to start.

Dash pots 88 and 89 may, if desired, be employed to render the oscillations of the lever more sluggish. The plungers of the dash pots may be secured suitably to brackets 90 and 91 respectively fixed to the panel 45, and their cylinders may be linked directly to the lever 51 and the core 58 respectively, the core being linked to the lever 51. Oil or air or any fluid may be employed in the dash pots which may be of ordinary well known construction. These dash pots are adapted to render the lever oscillations more suggish. Either or both may be used, but they are not an essential feature of this invention.

The spring 81 should have the right compression to open the pile sufficiently to increase its resistance sufficiently to prevent the rush of current heretofore described.

The weights may be varied until the proper adjustment is arrived at.

The rheostat 60 may also be varied, to vary the strength of the solenoid 56, and the rheostat and weights should be so varied as to properly coöperate.

What I claim is:—

1. In a welding system, a welding tool, a source of supply, a starting circuit and an automatic resistance in multiple therewith operated by variations of resistance in the welding arc to maintain a current of even amperage, thereby maintaining an even heating current at the arc.

2. In a welding system, a welding tool, a source of current supply, a starting circuit, an automatic resistance operated by the variation of resistance in the welding arc to maintain an even flow of heating current and a manually operated rheostat adapted to supply an arbitrarily fixed flow of additional heating current to the welding tool.

3. In a welding system, a welding tool, a source of current supply, a starting circuit, an automatic resistance operated by the variation of resistance in the welding arc to maintain an even flow of heating current and a manually operated rheostat adapted to supply arbitrarily, an additional fixed flow of current to the welding tool, located in a branch circuit around said automatic resistance.

4. In a welding system, a welding tool, a source of current supply, a starting circuit, an automatic resistance operated by the variation of resistance in the welding arc to maintain an even flow of heating current and a manually operated rheostat adapted to supply arbitrarily an additional fixed flow of current to the welding tool, located in a branch circuit around said automatic resistance and also in a branch circuit around said starting circuit.

5. The method of maintaining an even flow of current in a welding arc having a variable resistance, which consists in automatically varying the flow of current in a branch circuit to counteract the variation of resistance in the welding arc, and in supplying through another branch circuit a fixed flow of current.

6. In an electric arc welding system, a source of welding current, two welding terminals, one consisting of a welding pencil or tool and the other consisting of the work to be operated upon thereby, and means in said circuit adapted to vary the resistance of the welding circuit excluding the arc substantially and inversely to the variations of resistance of the welding arc, to maintain a substantially even flow of welding current across the arc.

7. In a welding system, a source of welding current, two welding elements, one consisting of a welding pencil or tool and the other consisting of the work to be operated upon thereby, and means to prevent spattering of metal located in said circuit before said elements are brought into contact and located between one of said elements and said source of current adapted to reduce the resistance of said welding circuit and bring the current into welding dimension operated by bringing said elements together into contact.

8. In an electric welding system, a source of welding current, two welding elements, one consisting of a welding pencil or tool and the other consisting of the work to be operated upon thereby, means in said circuit before said elements are brought into contact, located between one of said elements and said source of current, adapted to reduce the resistance of said circuit and bring the current into welding dimensions operated by bringing said welding elements together into contact, and means in said circuit between one of said elements and said source of welding current adapted to vary the resistance of said circuit inversely to the variation of the arc resistance between said two elements.

9. In a welding system, a welding implement adapted to supply welding metal across an arc, a source of current supply, a starting circuit, and an automatic resistance in multiple therewith operated by variations in resistance of the welding arc to maintain a current of even amperage and an even flow of welding metal across the arc.

10. In a welding system, a welding implement adapted to supply welding metal across an arc, a source of current supply, a starting circuit, an automatic resistance operated by the variations of resistance in the welding arc to maintain an even flow of heating current and an even flow of welding metal across the arc, and a manually operated rheostat adapted to supply an arbitrary fixed flow of heating current to the welding implement.

11. In a welding system, a welding implement adapted to supply welding metal across an arc, a source of current supply, a starting circuit, and an automatic resistance in multiple therewith operated by variations in resistance of the welding arc to maintain a current of even amperage and an even flow of welding metal across the arc, said automatic resistance being in series with the arc.

12. In an electric arc welding system, a source of current, a welding implement adapted to supply welding metal across the arc, means in series with the arc to vary the resistance of the welding circuit outside the arc, to compensate for the variations of resistance in said arc and to maintain a flow of welding metal across the arc, means to prevent the initial rush of current, and means to remove the same as the arc is drawn.

13. An electric arc welding system comprising a welding circuit including a variable resistance in series with the weld, and an electro-responsive device also in series with the weld and responsive to graduations in welding-current strength to gradually vary the said resistance to compensate for changes in the welding resistance.

14. An electric arc welding system comprising a welding circuit and a pressure-variable resistance and electro-responsive device both in series with the weld and with each other, and said electro-responsive device being arranged to vary the pressure on said resistance in response to welding-current changes, to compensate for resistance changes in the weld.

Signed at New York in the county of New York and State of New York this 10th day of June A. D. 1916.

DAVID H. WILSON.

Witnesses:
MYRON F. HILL,
MARY W. WALLACE.